United States Patent
Creeden et al.

(10) Patent No.: US 9,534,952 B2
(45) Date of Patent: Jan. 3, 2017

(54) INTEGRATED PARAMETER MONITORING IN A FIBER LASER/AMPLIFIER

(75) Inventors: Daniel J. Creeden, Nashua, NH (US); Joseph M. Owen, Derry, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 724 days.

(21) Appl. No.: 13/805,360

(22) PCT Filed: Mar. 19, 2012

(86) PCT No.: PCT/US2012/029641
§ 371 (c)(1),
(2), (4) Date: Dec. 19, 2012

(87) PCT Pub. No.: WO2012/141847
PCT Pub. Date: Oct. 18, 2012

(65) Prior Publication Data
US 2013/0087694 A1   Apr. 11, 2013

Related U.S. Application Data

(60) Provisional application No. 61/476,038, filed on Apr. 15, 2011.

(51) Int. Cl.
*G02B 6/26* (2006.01)
*G02B 6/42* (2006.01)
(Continued)

(52) U.S. Cl.
CPC ............. *G01J 1/0425* (2013.01); *G02B 6/245* (2013.01); *H01S 3/06708* (2013.01);
(Continued)

(58) Field of Classification Search
None
See application file for complete search history.

(56) References Cited

U.S. PATENT DOCUMENTS 4,076,375 A * 2/1978 Muska .................. G02B 6/262
                                                                         385/29
4,439,005 A * 3/1984 Winzer .......................... 385/48
(Continued)

OTHER PUBLICATIONS

PCT ISR mailed Jul. 13, 2012.

*Primary Examiner* — Chad Smith
(74) *Attorney, Agent, or Firm* — Finch & Maloney PLLC; Daniel J. Long; Scott J. Asmus

(57) ABSTRACT

Techniques are disclosed for monitoring parameters in a high power fiber laser or amplifier system without adding a tap coupler or increasing fiber length. In some embodiments, a cladding stripper is used to draw off a small percentage of light propagating in the cladding to an integrated signal parameter monitor. Parameters at one or more specific wavelengths (e.g., pump signal wavelength, signal/core signal wavelength, etc) can be monitored. In some such cases, filters can be used to allow for selective passing of signal wavelength to be monitored to a corresponding parameter monitor. The filters can be external or may be integrated into a parameter monitor package that includes cladding stripper with integrated parameter monitor. Other parameters of interest (e.g., phase, wavelength) can also be monitored, in addition to, or as an alternative to power. Numerous configurations and variations will be apparent in light of this disclosure (e.g., system-on-chip).

24 Claims, 8 Drawing Sheets

(51) Int. Cl.
*G01J 1/04* (2006.01)
*H01S 3/067* (2006.01)
*G02B 6/245* (2006.01)
*G02B 6/28* (2006.01)
*H01S 3/094* (2006.01)
*H01S 3/10* (2006.01)

(52) U.S. Cl.
CPC ........ *H01S 3/06758* (2013.01); *G02B 6/2852* (2013.01); *H01S 3/094007* (2013.01); *H01S 3/10015* (2013.01)

(56) References Cited

U.S. PATENT DOCUMENTS

| | | | | |
|---|---|---|---|---|
| 5,146,521 | A | * | 9/1992 | Hartog .............................. 385/48 |
| 5,500,913 | A | * | 3/1996 | Allen ...................... C03B 37/15 |
| | | | | 219/121.6 |
| 5,883,585 | A | * | 3/1999 | Akutsu .................... G08G 1/04 |
| | | | | 200/86 A |
| 5,926,592 | A | * | 7/1999 | Harris ................ G02B 21/0024 |
| | | | | 385/127 |
| 7,811,844 | B2 | | 10/2010 | Carothers et al. |
| 7,847,353 | B2 | | 12/2010 | Hill et al. |
| 2004/0022495 | A1 | * | 2/2004 | Shapiro ................ G02B 6/4212 |
| | | | | 385/48 |
| 2005/0157983 | A1 | | 7/2005 | Aoki et al. |
| 2006/0198582 | A1 | * | 9/2006 | Kakui .................. G02B 6/2826 |
| | | | | 385/48 |
| 2007/0212006 | A1 | | 9/2007 | Wysocki |
| 2008/0044135 | A1 | * | 2/2008 | Furuichi ................ G02B 6/327 |
| | | | | 385/34 |
| 2009/0252451 | A1 | | 10/2009 | Lagakos et al. |

* cited by examiner

INTEGRATED PARAMETER MONITORING IN A FIBER LASER/AMPLIFIER

RELATED APPLICATIONS

This application claims the benefit of and priority to U.S. Provisional Application No. 61/476,038, filed on Apr. 15, 2011, which is herein incorporated by reference in its entirety.

FIELD OF THE DISCLOSURE

The invention relates to fiber optics, and more particularly, to integrated parameter monitoring of an optical fiber.

BACKGROUND

Typical low power fiber lasers/amplifiers use tap couplers to harvest a small percentage of the power (typically, <1%) in the fiber core. Once the coupler taps off the power, that power can be directed to an energy monitor (power meter, detector, etc). In high power systems (typically, >1 watt) and/or systems using specialty fibers, tap couplers generally do not exist, so monitoring the output power is typically done at the output of the fiber laser system.

SUMMARY

One embodiment of the present invention provides a parameter monitoring system including optical fiber with a core, a cladding, and a cladding stripper. The cladding stripper is designed to strip light signals that are propagating in the cladding. A parameter monitor is integrated with the cladding stripper and is designed to receive a portion of the light that is stripped from the cladding. In some cases, the cladding is an inner cladding for containing light propagating in the core, and the optical fiber further includes an outer cladding for containing light propagating in the inner cladding, and the cladding stripper is in place of the outer cladding in at least one location. In one such case, the cladding stripper is selectively deposited on the cladding in one or more locations and is not contact with the outer cladding. In some cases, the system may also include a filter that passes light signals of interest to the signal parameter monitor and excludes signals not of interest. In some cases, the system may also include multiple signal parameter monitors, each integrated with the cladding stripper and designed to detect light signals of interest and exclude other light signals. In some cases, the system may also include a signal parameter monitor that is designed to provide energy information regarding the detected light signals to control electronics. In some such cases, the system may also provide that the control electronics are designed to perform failure mode detection, failure mode reporting, or failover protection in response to the energy information provided by the signal parameter monitor. In some cases, the system may also include a signal parameter monitor designed to provide phase information regarding the detected light signals to control electronics. In some such cases, the system may also provide that the control electronics are designed to perform phase adjustment, failure mode detection, failure mode reporting, or failover protection in response to the provided phase information. In some cases, the system may also include a signal parameter monitor designed to provide wavelength information regarding the detected light signals to control electronics. In sonic cases, the system may also include a waveguide that directs light from the cladding stripper to the signal parameter monitor. The light signal propagating in the cladding may be, for example, unabsorbed pump light, but may also be or otherwise include leaked core light. In some cases, the system further includes a pump source for pumping the cladding of the optical fiber, wherein the light signal propagating in the cladding includes unabsorbed pump light.

Another embodiment of the present invention provides a method for monitoring parameters of light within an optical fiber that includes stripping, a light signal from a fiber cladding with a fiber stripper, and receiving a portion of the stripped light with a signal parameter monitor integrated with the cladding stripper. The method may also include directing a portion of the stripped light from the cladding stripper to the signal parameter monitor using a waveguide. The method may also provide that receiving stripped light by the signal parameter monitor includes detecting light signals of interest and excluding light signals not of interest. The method may also include providing energy information regarding detected light signals to control electronics, and performing at least one of detecting a failure mode, reporting a failure mode, and/or protecting from failover in response to the energy information provided to the control electronics. The method may also include providing phase information regarding detected light signals to control electronics, and performing at least one of adjusting phase, detecting a failure mode, reporting a failure mode, or protecting from failover in response to the phase information provided to the control electronics. The method may also include providing wavelength information regarding detected light signals to control electronics.

Numerous variations will be apparent in light of this disclosure. For example, the system may be implemented as an integrated circuit or system-on-chip or chip set. One such integrated circuit embodiment includes an optical fiber configured with a core, an inner cladding for containing light propagating in the core, an outer cladding for containing light propagating in the inner cladding, and cladding stripper in place of the outer cladding in at least one location, the cladding stripper for stripping a light signal propagating in the inner cladding from the inner cladding. The cladding stripper is not in contact with the outer cladding. In addition, at least one signal parameter monitor is integrated with the cladding stripper, for receiving at least a portion of the light signal stripped from the inner cladding. In one such case, the at least one signal parameter monitor is associated with at least one filter that passes a light signal of interest to the parameter monitor and excludes light signals of non-interest. In another such case, the at least one signal parameter monitor receives at least a portion of the light signal from the cladding stripper via at least one waveguide.

The features and advantages described herein are not all-inclusive and, in particular, many additional features and advantages will he apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
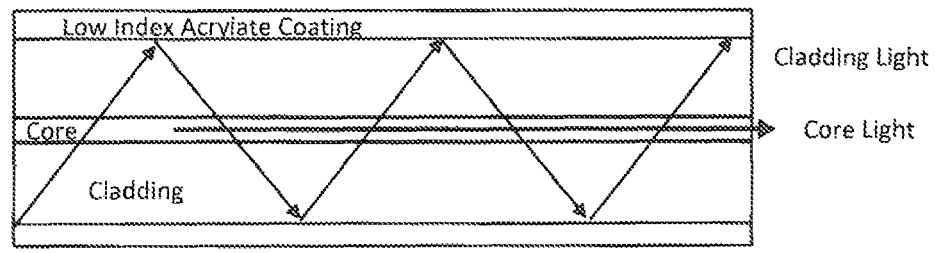
FIG. 1 illustrates a cross-sectional side view of a typical double-clad fiber.

Techniques are disclosed for monitoring amounts of power and/or other parameters in a high power fiber laser or amplifier system without adding a tap coupler or increasing fiber length. In some embodiments, a cladding stripper is used to draw off a small percentage of light propagating in the cladding to an integrated signal energy monitor. Power at one or more specific wavelengths (e.g., pump signal wavelength, signal/core signal wavelength, etc) can be monitored. In some such cases, filters can he used to allow for selective passing of signal wavelength to be monitored to a corresponding energy monitor. The filters can be external or may be integrated into an energy monitor package that includes cladding stripper with integrated energy monitor. Numerous configurations and variations will be apparent in light of this disclosure. Other parameters of interest can also be monitored, in addition to, or as an alternative to power. For instance, a phase monitor can be used to measure phase, thereby allowing a phase control loop to make adjustments to provide phase coherence between multiple lasers.

General Overview

It is sometimes beneficial to monitor the laser output power (e.g., for reliability checking, etc) in laser a system. In crystal-based laser systems, this can be done by looking at the power leaking through an optical mirror. In a fiber system, however, the light is generally confined to the fiber, so it is difficult to monitor output power (or diode power) in the fiber itself. As previously explained, typical low power fiber lasers/amplifiers use tap couplets to pick off a small percentage of the power in the fiber core. Such a coupler can tap off <1% of the power, and that power can be directed to an energy monitor such as a power meter, detector, etc. One disadvantage of tap couplers is that they are generally designed for purely single-mode fiber and low power. In addition, high power tap couplers for large-mode area fiber or multimode fiber generally don't exist, as they cannot be reliably manufactured with high power fibers and cannot withstand the thermal loading that is typical of many such applications.

However, in high power laser systems, light propagating in the cladding can be effectively ejected from the cladding by using a cladding mode stripper. Thus, and in accordance with an embodiment of the present invention, a cladding stripper can be used to dump residual pump light (and/or any leaked signal light) propagating in the cladding, such that the cladding stripper effectively acts as a tap coupler, where the light which is out-coupled in the cladding stripper is applied to one or more energy monitors to observe the amount of power in the fiber (and at various wavelengths of interest, if so desired). In one particular such embodiment, each energy monitor is integrated with the cladding stripper, using standard semiconductor processing such as complementary metal oxide semiconductor (CMOS) processing, so that the light out-coupled from the cladding stripper is directly applied to an energy monitor.

Typically, light propagating in the cladding of a fiber is unabsorbed pump light; however, due to splicing losses, for example, a small percentage of the fiber laser/amplifier signal (i.e., core light) may also be propagating in the cladding. A cladding stripper will generally remove any light in the cladding in all directions. Thus, by integrating an energy monitor into a cladding stripper in accordance with an embodiment of the present invention, the stripped-off diode power as well as the stripped-off fiber laser/amplifier output power can be monitored and equated to an actual power level. Such an integrated configuration effectively enables monitoring one or more features of a fiber laser in a single component without increasing fiber length and eliminating otherwise reducing need for additional external optical components such as free-space couplers, taps, or monitoring circuits at the fiber laser output). This configuration is also independent of fiber dopant or wavelength of operation.

Conventional fiber laser/amplifiers utilize double-clad fibers to allow for efficient coupling of pump light into the highly multimode cladding. Typically, the cladding has a diameter in the range of about 125 microns up to 400 microns, or larger depending on factors such as the fiber geometry, with numerical apertures greater than, for example, 0.46. In such fibers, only the cores are doped with rare-earth ions (e.g., Yb, Er, Er:Yb, Tm, Ho, etc). The inner cladding is typically made of an optical glass having a lower index of refraction that is lower than the index of refraction of the core, and the second outer cladding is a coating (e.g., acrylate) which is deposited on the fiber during the draw process used in manufacturing the fiber. This coating has an index of refraction lower than the cladding index and acts to waveguide any light in the cladding.

In a fiber laser or amplifier, it is sometimes useful to pump the cladding, as it is larger than the core and has a higher acceptance angle (or numerical aperture). As the pump light propagates along the fiber, it gets absorbed as it passes through the doped core thereby inverting the ions in the core (this is generally an exponential absorption which follows Beer's law). For example, monolithic fiber systems may include splices between, for instance, doped gain fibers and passive fibers for transport of optical light, or between a doped fiber and a pump combiner, which is a fiber device which couples pump light into the cladding of the fiber. Other splices include, for example, a splice between the output of the fiber laser/amplifier and a passive transport fiber. These splices have generally low loss (e.g., <0.1 dB); however, each splice will ultimately launch a percentage of light that is propagating in the fiber core into the cladding.

Generally, only core light is useful in a fiber system, and light in the cladding is either unabsorbed pump light or additional light from the core which was launched into the cladding at a splice. Since the cladding of a fiber is multimode, the light propagating is generally not useful. To eliminate this light it is common practice to use a cladding mode stripper.

A cladding mode stripper is a device in which the acrylate coating (or other suitable outer cladding coating material) on the inner cladding is removed, and the inner cladding is then placed in contact with a high refractive index material. Fibers provide waveguide properties as long as the interfaces between the different layers support total internal reflection (i.e., the index of the outer layer is lower than the index of the inner layer). If, for example, the low index acrylate coating (e.g., with an index of 1.36) is stripped away and a high index material (e.g., with an index >1.44) is placed in contact with the inner cladding (e.g., with an index of 1.44), then any light that is propagating in the inner cladding will eventually propagate through the cladding/high index material interface and will no longer be confined to the fiber.

Thus, since the cladding stripping material has a high refractive index compared to the inner cladding, any light at that interface cannot be guided in the fiber, and thus will leak out of the cladding. To manage this stripped light, the cladding stripper can be placed on a heat sink and/or in a beam dump, if so desired. The material which can be used for cladding stripper may be any material which can maintain optical contact with the cladding, such as liquids, gels, or optical adhesives with a higher refractive index than the fiber cladding. If a liquid/gel/adhesive is placed in the fiber uniformly, for instance, then light will leak out from the cladding axially along the fiber in all directions. In accordance with an embodiment of the present invention, this dumped cladding light can be used in integrated power monitoring applications.

Optical Fiber with Out-coupling of Cladding Light

FIG. 1 illustrates a cross-sectional side view of a double-clad fiber. As can be seen, the fiber includes a core surrounded by a cladding. The cladding is covered by a low index coating (effectively, an outer cladding), which is an acrylate coating in this example case. The core and cladding materials can also be implemented with other conventional materials as commonly done.

As can further he seen, the light propagating in the fiber includes both core light (which is propagating in the core) and cladding light (which is propagating in the cladding). The light in the cladding can be, for example, unused pump light, or leaked core light (e.g., due to splice losses), or a combination of both unused pump light and leaked core light. In any case, the cladding light is waveguided or otherwise contained within the fiber due to the outer low index coating.

The pump light and core light are generally at different wavelengths, and therefore each of these optical signals can be monitored separately. The pump light can be monitored, for example, to observe if the pump diodes used in the fiber laser/amplifier are operational. The leaked core light can be monitored, for instance, to observe if the laser is working properly, or if the power level has decreased. To monitor the unused pump light and/or leaked core light in accordance with an embodiment of the present invention, a cladding stripper having an integrated optical detector that is sensitive to the wavelength of interest can be used, as will be discussed in turn.

Figure 2:
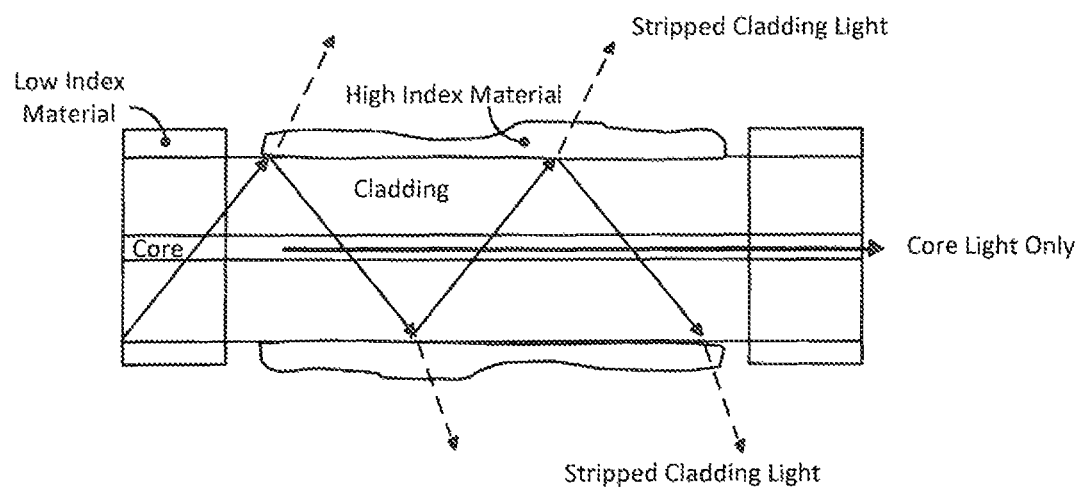
FIG. 2 illustrates a cross-sectional side view of a double-clad fiber configured with a cladding stripper, in accordance with an embodiment of the present invention.

FIG. 2 illustrates a cross-sectional side view of a double-clad fiber configured with a cladding stripper, in accordance with an embodiment of the present mention. As can be seen, a portion of the low refractive index coating may be removed and/or otherwise replaced with a high index material. As previously explained, the high index material allows the cladding light to refract out of, or otherwise be stripped out or dumped from, the fiber as shown.

As can be further seen in this example embodiment, note that the high index cladding stripper material is not in contact with both the cladding and the remaining acrylate (or other low index coating material) at the same time. Rather, the cladding stripper is only in contact with the bare cladding (e.g., glass, or other suitable cladding material), and on either side, a relatively small space (e.g., 1 to 3 mm) of the cladding is exposed. The reason for this is that, for some high power laser applications, if the high index cladding stripper material is in contact with both the low index coating and the cladding (e.g., at the stripped acrylate/glass interface), the power being stripped out of the cladding can actually burn the low index coating material (e.g., acrylate) and may damage the fiber. Note, however, that other relatively lower power embodiments may be implemented with the high index cladding stripper material in contact with both the cladding and the low index coating material. Still in other high power embodiments, a low index coating material that will not burn at the given power range can be used, and in such cases, the high index cladding stripper material may be in contact with both the cladding and that low index coating material.

Some examples of suitable high index cladding stripper materials include Norland Optical Adhesive 61 ("NOA 61") or Norland Optical Adhesive 63 ("NOA 63"), from Norland Products Inc. Both of these have an index of refraction of about 1.56. Another example index matching gel is Smart-Gel® OCK-433, from Nye Lubricants, Inc., which has an index of about 1.46. Note, however, that the index can vary and other adhesives, glues, or gels can have an index, for example, of 1.44 or lower, or higher than 1.56. Ideally, the high index material maintains its high index over the temperature range in which the fiber will operate. If the selected stripper material index gets too small due to temperature change, then it may fail in stripping out the cladding light. In general, the high index material selected will depend on factors such as the index of the cladding material to be stripped as well as the temperature range in which the fiber will operate and the power range of the application at hand. As will be appreciated, similar reasoning can be applied when selecting the fiber materials, with respect to the cladding material and the low index coating material.

Cladding Stripper with Integrated Parameter Monitor

Figure 3A:
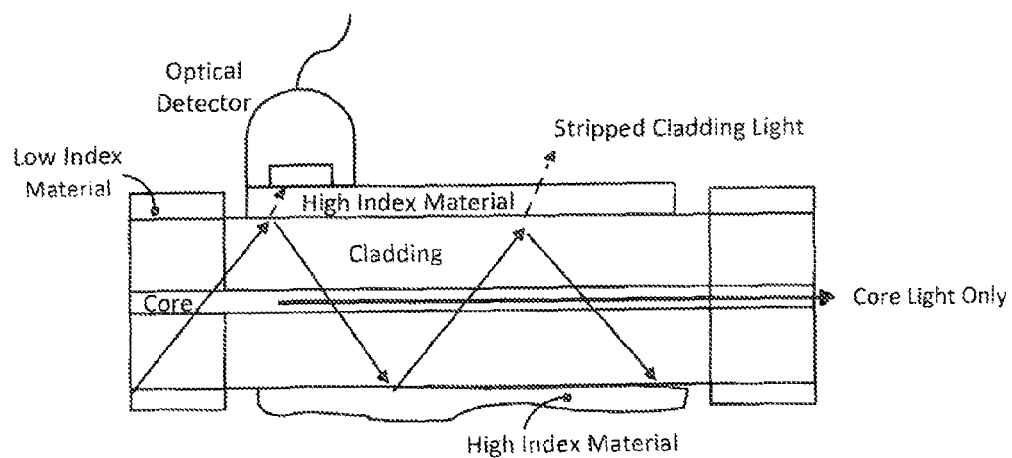
FIG. 3a illustrates a cross-sectional side view of a double-clad fiber configured with a cladding stripper and an integrated parameter monitor, in accordance with an embodiment of the present invention.

FIG. 3a illustrates a cross-sectional side view of a double-clad fiber configured with a cladding stripper and integrated parameter monitor, in accordance with an embodiment of the present invention. As can be seen, the high index cladding stripper has an integrated optical detector that is sensitive to a wavelength of interest, which in this example case is the wavelength of pump light. As will be appreciated in light of this disclosure, the cladding stripper with integrated parameter monitor can be implemented at one or more select locations on a given fiber.

The cladding stripper dumps light which is in the cladding, and the integrated optical detector allows for any number of parameters associated with that stripped light to be monitored. In accordance with one particular example embodiment, the monitored parameter is power or energy). Such an energy monitoring configuration allows for monitoring, for instance, of the pump in a fiber laser or amplifier system. A reduction in the amount of pump energy detected by the optical detector or other suitable parameter monitor may indicate, for example, that the pump source (typically a laser diode) is failing or otherwise out of specification.

The optical detector or parameter monitor may include, for example, a photodiode, pyroelectric, or any other type of optical detector that can sense the parameter of interest or some other parameter or parameter set from which the parameter of interest can be derived. With a single detector, a single signal (either unused pump or leaked core light) can be monitored. With two detectors, both the unused pump light and the leaked core light can be monitored. In some example embodiments, where there is more than one wavelength propagating in the fiber core, multiple detectors can be used with a cladding stripper to monitor each core signal independently. In one such example case, filters are used so that the corresponding detectors do not receive the wrong signals. Similarly, where there is more than one pump signal wavelength propagating in the cladding, multiple detectors (with appropriate filtering) can be used with a cladding stripper to monitor each pump signal independently. Any number of pump and/or core signal power monitoring schemes will be apparent in light of this disclosure.

As previously explained, other signal parameters of interest (e.g., energy/power, wavelength, phase, number of signals, frequency or timing of signal occurrence, threshold detection, etc) may be monitored as well, and the claimed invention is not intended to be limited to monitoring any particular parameter or set of parameters. For example, the integrated cladding stripper and monitor package can also be used to coherently phase multiple fiber signals. In one such example case, the integrated monitor can be a photonic circuit configured for monitoring phase of a single fiber laser. If multiple fiber lasers are present on a single optical circuit/chip, the phases of all of these fiber lasers can be monitored and compared. This phase information can then be fed into a feedback phase control loop (which can be implemented as conventionally done) and the phase of each fiber laser could be appropriately adjusted such that the outputs from the individual fiber lasers would be coherent with respect to each other. This allows for power scaling while utilizing multiple lower power fibers. By integrating the phase monitor and control into an optical circuit, the phases and power can be monitored and controlled without requiring free-space beam sampling.

Figure 3B:
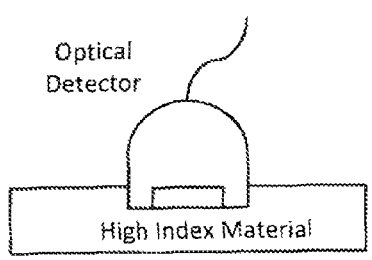
FIGS. 3b and 3c each illustrates a cross-sectional side view of an optical detector embedded within a cladding stripper, in accordance with an embodiment of the present invention.
Figure 3C:
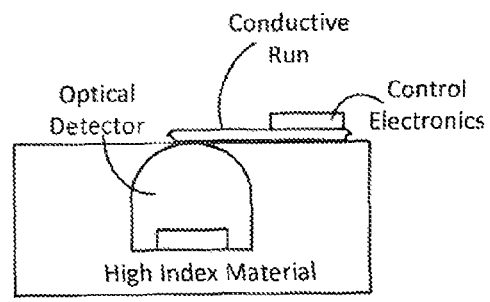

In one example embodiment, the optical detector is integrated with the cladding stripper via a mount. For instance, in one such embodiment, a standard optical detector implemented with a TO5 or TO8 can (or other suitable packaging) can be used. The detector itself can be placed in close proximity to the cladding stripper material (e.g., in the range of 0.1 to 3 mm away, or closer), or otherwise in contact with or embedded in the cladding stripper material. Referring to FIG. 3b, one embodiment of an optical detector partially embedded within a cladding stripper is shown. In this example case, the output of the optical detector is provided by way of a wire so that detection signals output by the optical detector can be passed, for instance, to a control electronics or any other suitable processing module. FIG. 3c illustrates another embodiment having an optical detector that is fully embedded within a cladding stripper. The output of the optical detector is accessed by way of a conductive run on a semiconductor substrate in which the optical detector is formed or otherwise deployed (the integrated circuit is only partially shown). In this example case, the detection signals output by the optical detector are provided to control electronics (e.g., processor or purpose-built silicon) designed to perform, for example, failure mode detection, failure mode reporting, or failover protection in response to the information provided by or otherwise derived from the optical detector. In any such cases, whether spaced apart from the cladding stripper, or in direct contact with or otherwise embedded in the cladding stripper, the optical detector is able to directly 'look' at the output from the high index cladding stripper material so that light signals of interest propagating therein can be assessed.

Figure 4:
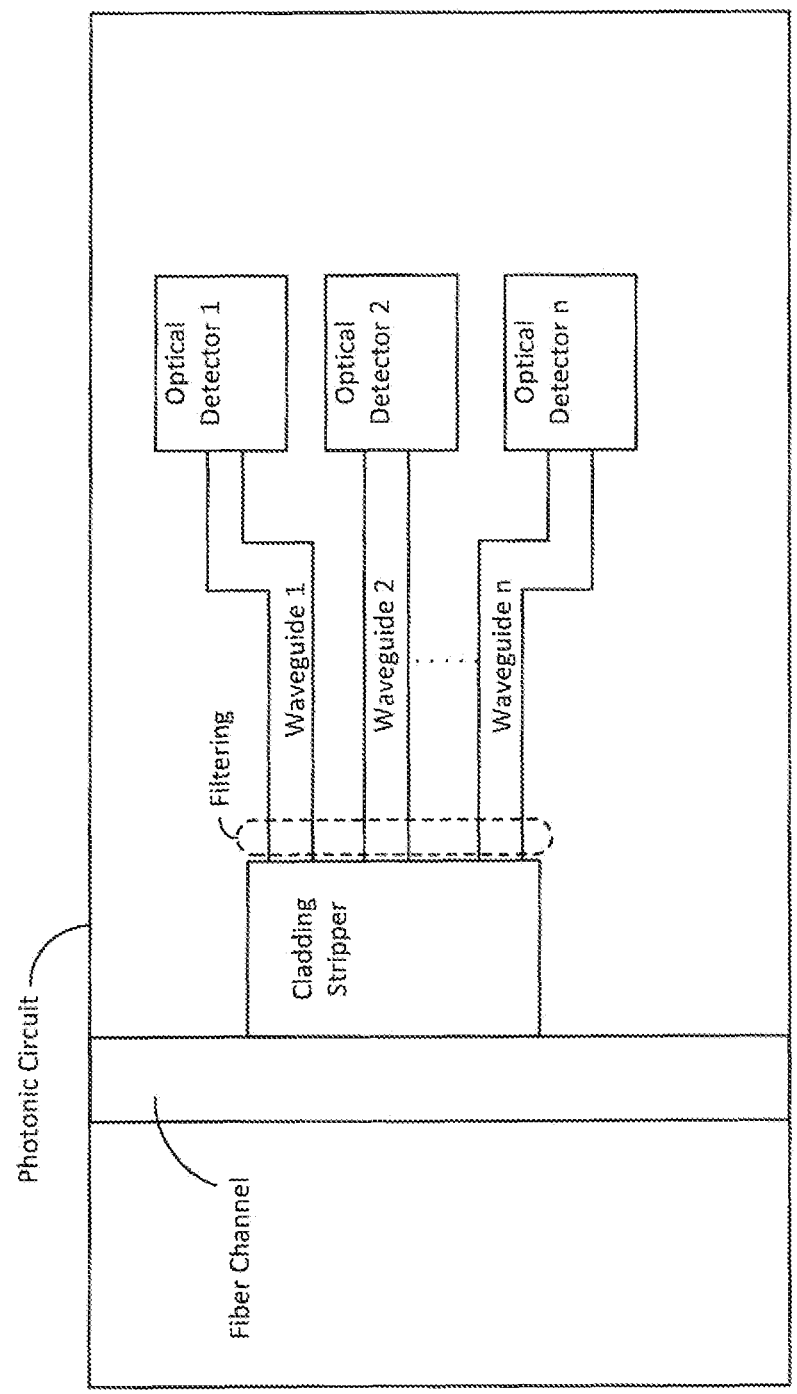
FIG. 4 illustrates a photonic circuit configured with a cladding stripper and integrated optical detectors, in accordance with another embodiment of the present invention.

FIG. 4 illustrates one embodiment of the present invention wherein the cladding stripper and parameter monitors can be integrated into a photonic circuit. The cladding stripper may be placed in a channel along the photonic circuit. As will be apparent in light of this disclosure, a fiber laser or amplifier may also be placed in a channel at least partially contacting the cladding stripper. As can be further seen, the cladding stripper may be connected to one or inure waveguides along its length. The light in the fiber cladding may contact the cladding stripper and may enter one or more of the waveguides 1-n and be guided to various monitors or optical detectors 1-n. As can be further seen, a filtering scheme can be employed (generally depicted with dashed oval), so as to ensure the desired wavelength is provided to the appropriate waveguide and/or detector. The filters may be implemented, for example, as discrete filters or coatings provided, for instance, at the input of each waveguide and/or optical detector. In other embodiments, the waveguides themselves may be frequency selective such that they only direct light of a certain frequency range of stripped light to the optical detectors. Any number of filtering schemes can be used here, and the claimed invention is not intended to be limited to any particular one. The dimensions of waveguides, filters and other optical components can vary as needed and are dependent, for example, on the wavelengths of interest, and the material of the photonic circuit. Variation on the embodiment shown will be apparent. For instance, in another embodiment, the one or more detectors may comprise a separate optical circuit that operatively couples with a photonic circuit having the cladding stripper and waveguides. In another embodiment, the cladding stripper itself is frequency selective, such that one or more selective cladding strippers may act as filters directing light to one or more waveguide or directly to one or more optical detectors (some embodiments can be implemented waveguides). As will further be appreciated in light of this disclosure, the one or more optical detectors can be used to monitor power, wavelength, optical phase of the signals, as well as other parameters or events of interest (e.g., threshold detection). In some embodiments, the photonic circuit may be partially or entirely implemented through a semiconductor process.

With multiple monitoring points integrated onto a single cladding stripper, a complete fiber laser monitoring system can be implemented in a single location without requiring any external components or fiber tap. Such a photonic circuit could be implemented, for example, in silicon or other suitable semiconductor materials using standard CMOS processes. Further example details on implementing such a photonic circuit can be found, for example, in U.S. Pat. No. 7,811,844, titled "Method for fabricating electronic and photonic devices on a semiconductor substrate" and U.S.

Pat. No. 7,847,353 titled "Multi-thickness semiconductor with fully depleted devices and photonic integration." Each of these patents is herein incorporated by reference in its entirety, and was also included in the previously incorporated U.S. Provisional Application No. 61/476,038.

Figure 5:
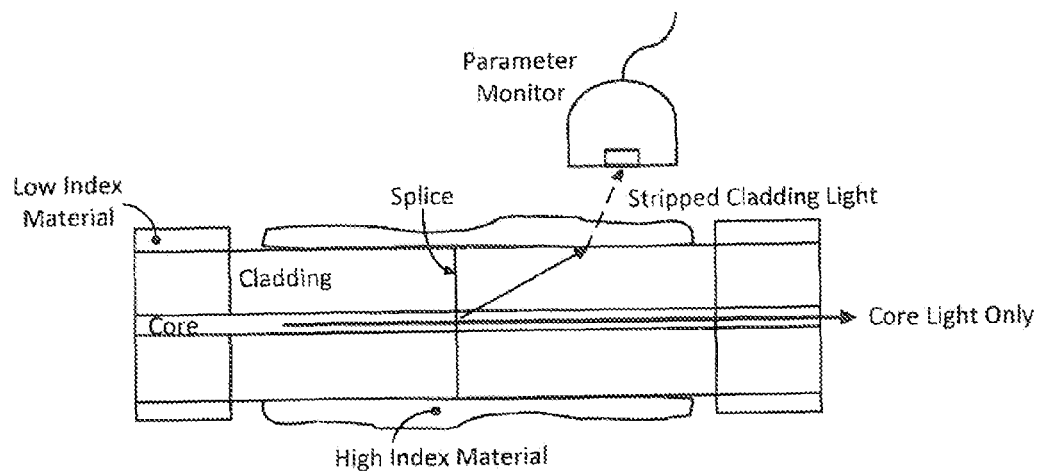
FIG. 5 illustrates a cross-sectional side view of a double-clad fiber configured with a cladding stripper and integrated parameter monitor, in accordance with another embodiment of the present invention.

FIG. 5 illustrates a cross-sectional side view of a double-clad fiber configured with a cladding stripper and integrated parameter monitor, in accordance with another embodiment of the present invention. In this example case, the fiber system includes a splice which may cause some of the core light to leak into the cladding. The high index cladding stripper dumps leaked core light and has an integrated parameter monitor that is sensitive to the core light wavelength.

A signal (or leaked core light) energy monitor configuration such as shown in this example embodiment allows for monitoring of the signal/core power in a fiber laser or amplifier system. A reduction in the amount of core signal power may indicate, for example, that the fiber laser/amplifier is failing, or that power is reduced and could indicate that operation of the laser should be discontinued to prevent damage or until an investigation can be carried out.

Note that the cladding stripper with the integrated optical detector does not necessarily have to be located at a splice or otherwise within a certain distance of the splice. For instance, it can be located anywhere downstream from the splice as well. So long as the cladding stripper can dump the signal of interest that is propagating in the cladding, and pass it to a corresponding detector. Further note that the optical detector does not necessarily have to be in contact with the cladding stripper, but may be spaced at a suitable distance therefrom. To this end, some embodiments may include an integrated arrangement where the cladding stripper and optical detector are either in direct contact or suitably spaced from one another.

Multiple Integrated Signal Energy Monitors

Figure 6:
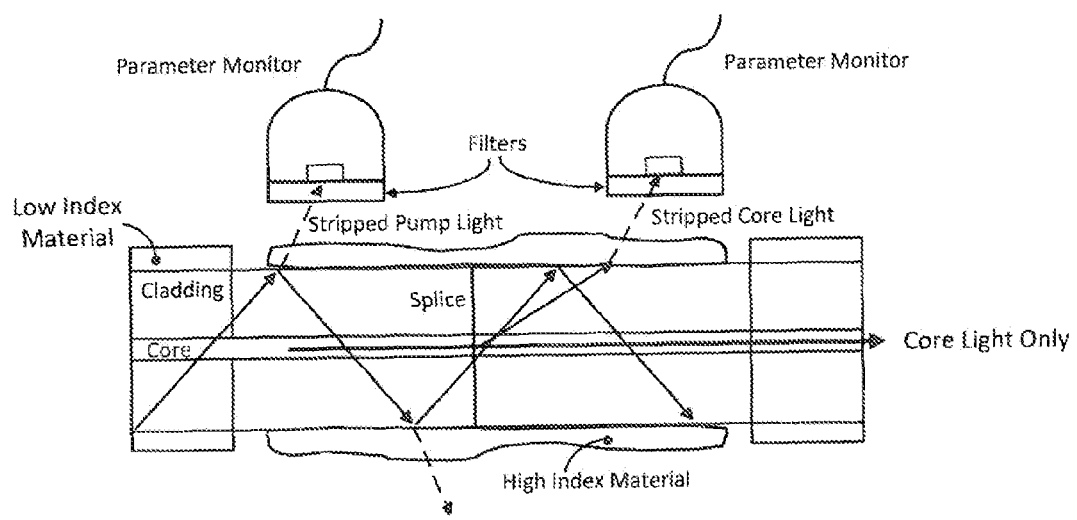
FIG. 6 illustrates a cross-sectional side view of a double-clad fiber configured with a cladding stripper and integrated dual signal parameter monitor, in accordance with another embodiment of the present invention.

FIG. 6 illustrates a cross-sectional side view of a double-clad fiber configured with a cladding stripper and integrated dual signal energy monitor, in accordance with another embodiment of the present invention. In this example case, the fiber system includes a splice causing some of the core light to leak into the cladding. In addition, there is unused pump light propagating in the cladding. The high index cladding stripper strips the pump light and leaked core light and has an integrated optical detector that is sensitive to the core light wavelength and another integrated optical detector that is sensitive to the unused pump light wavelength.

Such a dual energy monitor configuration allows for monitoring of both the pump and signal/core power m a fiber laser or amplifier system. If both monitors indicate power is reduced, then this may be an indication, for example, that the fiber is failing and could potentially lead to a breakage in the fiber. In some example embodiments, the energy monitors can be connected to control electronics configured to shut down the system prior to any catastrophic failure, or until an investigation can be conducted. In one such embodiment, the control electronics can be configured to shut down the system exhibiting atypical power, and to switch in an auxiliary system. The control electronics may be further configured to issue notifications (e.g., email or other message) so that appropriate personnel are made aware of the detected condition. Any number of such failure mode detection, reporting, and/or failover/redundancy schemes can be implemented, as will be appreciated in light of this disclosure.

In the dual monitor case, one or more filters can be used to prevent a given detector from monitoring an incorrect wavelength (e.g., to ensure that the pump power monitor does not detect the leaked core light, or the leaked core light power monitor does not detect the pump light). These filters may be integrated into an energy monitor package, or can be external. For instance, a given filter can be integrated into the high index cladding stripper material or the aperture/lens of the corresponding detector. In the case of a filter being integrated into the high index cladding stripper material, the filtering function can be provided by a coating on an area of the cladding stripper material, and/or can be inherent to the cladding stripper material itself, in accordance with some embodiments. In such cases, therefore, the cladding stripper material would have both the desired high index of refraction as well as be opaque to a range of wavelengths that include other light signals propagating in the cladding for that given application.

The specific filter configuration will depend on the wavelength of interest. For example, in one example embodiment, if the wavelength of interest is 1.9 micron light in the core of a fiber that is pumped with 790 nm light, then a silicon window (e.g., uncoated or anti-reflection coated) can be used. The silicon will pass 1908 nm light, but it is opaque to 790 nm light. In other embodiments, such as a Yb fiber laser, a fused silica window can be used, where the window is coated such that any pump light (e.g., 915-975 nm) is reflected and the signal core light (e.g. 1 micron) is transmitted through the window. As will be appreciated in light of this disclosure, the choice of coating and substrate material is dependent on the fiber laser itself.

In some embodiments, the cladding stripper with integrated energy monitor techniques as described herein can be used to provide a compact and inexpensive method to monitor fiber laser/amplifier system output power or other parameter/event of interest) without looking at the actual output of the fiber laser. Moreover, it can be incorporated into an already existing device design, making it a compact and efficient solution compared to, for instance, a tap coupler or other monitoring means.

System Architecture

Figure 7:
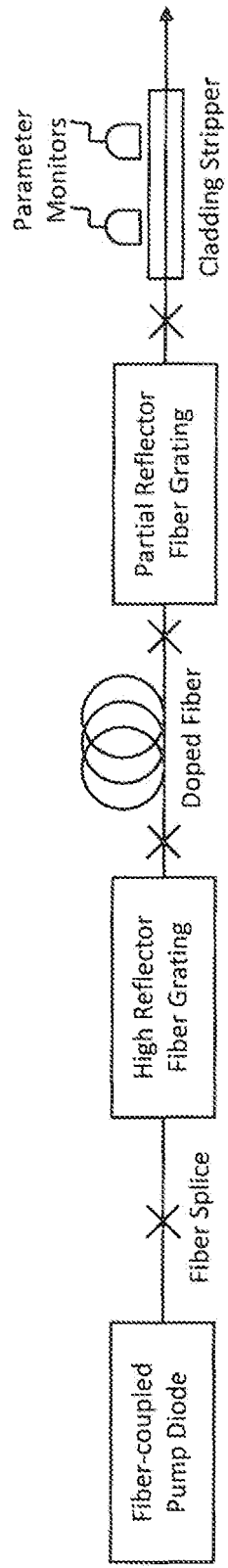
FIG. 7 illustrates a fiber laser system configured with a cladding stripper having one or more integrated parameter monitors, in accordance with an embodiment of the present invention.

FIG. 7 illustrates a fiber laser system configured with a cladding stripper having integrated parameter monitors, in accordance with an embodiment of the present invention. In this example embodiment, the cladding stripper/monitor may be integrated at the output of the laser section to monitor power. As will be appreciated, however, the cladding stripper/monitor can be implemented at other locations or the fiber system as well, or at multiple locations of the system (e.g., before and after the partial reflector fiber grating). In addition to being implemented at other locations on the fiber system, the parameter monitor may be configured to monitor wavelength, phase, number of signals, or other parameters and/or events of interest.

Each of the other elements shown in FIG. 7 can be implemented with conventional or custom technology, including the fiber-coupled pump diode, high reflector fiber grating, doped fiber, partial reflector fiber grating, and the various fiber splices (generally designated with a X). As will be appreciated in light of this disclosure, such componentry can be selected based on various factors such as the target application at hand, including power levels and wavelengths of interest, as well as any upstream and/or downstream systems with which the fiber laser system may be operatively coupled. Numerous other embodiments may include fewer or additional components, as will be appreciated.

Figure 8:
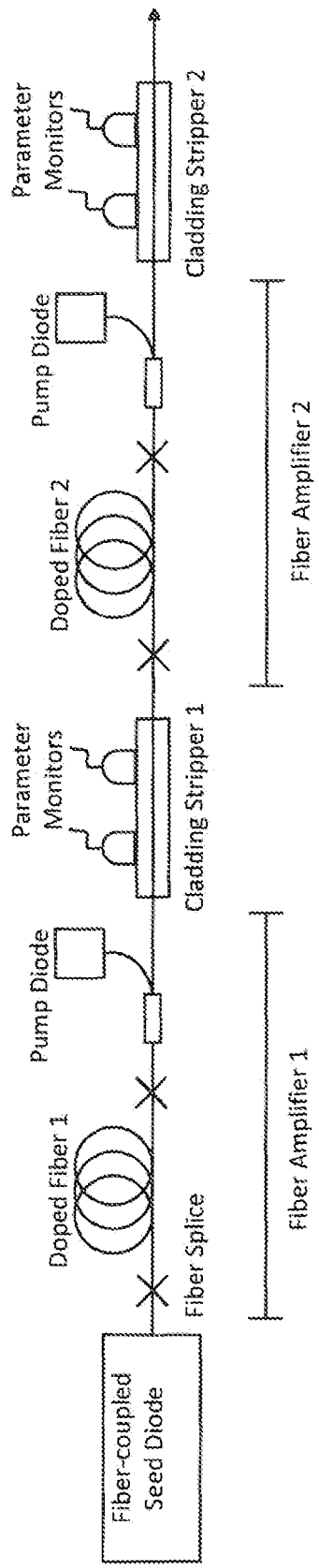
FIG. 8 illustrates a fiber amplifier system configured with multiple cladding strippers each having one or more integrated parameter monitors, in accordance with an embodiment of the present invention.

FIG. 8 illustrates a fiber amplifier system configured with separate cladding strippers 1 and 2 each having one or more integrated parameter monitors, in accordance with an embodiment of the present invention. In this example embodiment, a cladding stripper/monitor package is placed after each of fiber amplifiers 1 and 2 to monitor how each stage is behaving. If, for example, the parameter monitors of cladding stripper 1 detect a drop in output power and/or other event of interest, then fiber amplifier 2 can be shut down to prevent damage to the system. Each of these monitors can be used to look at performance during laser/amplifier operation and/or can be used to trigger a control circuit to safeguard the system from potential failures.

Each of the other elements shown in FIG. 8 can be implemented with conventional or custom technology, including the fiber-coupled seed diode, doped fiber 1 and the corresponding pump diode, doped fiber 2 and the corresponding pump diode, and the various fiber splices (generally designated with a X). Just as with the system shown in FIG. 7, such componentry can be selected based on any number of factors such as the target application, including power levels and wavelengths of interest, as well as any upstream and/or downstream systems with which the fiber amplifier system may be operatively coupled.

Figure 9:
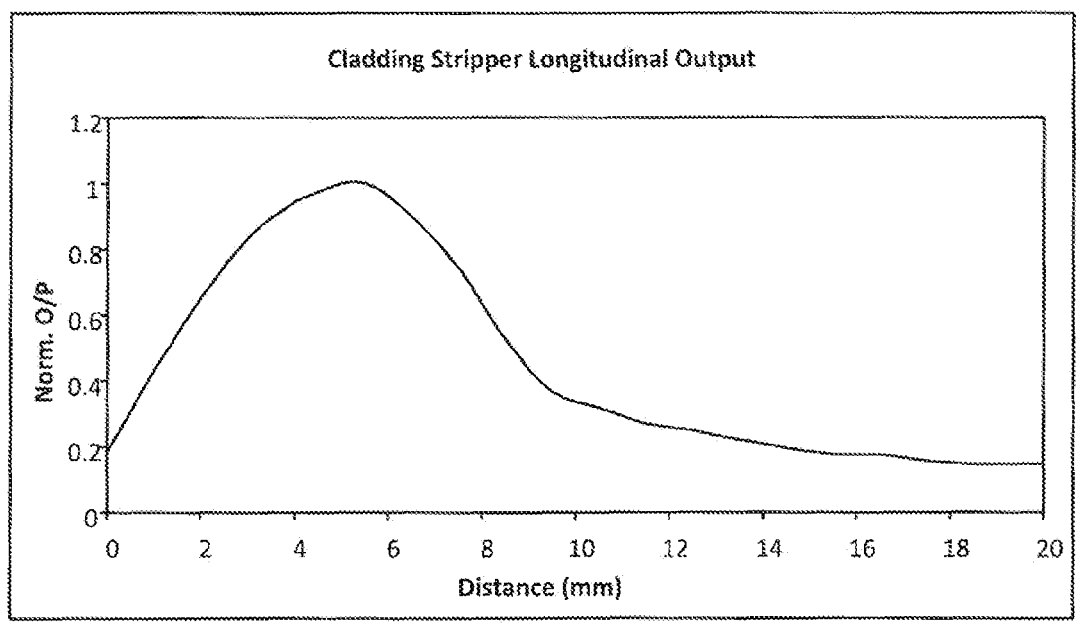
FIG. 9 is a plot showing the distribution of normalized detector response (to leaked core light) along the longitudinal axis of the cladding stripper, with most of the response occurring in the first few mm of length, in accordance with an embodiment of the present invention.

The plot shown in FIG. 9 indicates tested device performance on a signal energy monitor (leaked core light) to demonstrate the feasibility of a cladding stripper with an integrated energy monitor to detect leaked core light. In this test case, a filter was used as the detector input window to block any residual pump light so that the detector was only monitoring leaked core light (the filter was transparent to the core light, but opaque to the residual pump light). The plot shows the distribution of normalized detector response (to leaked core light) along the longitudinal axis of the cladding stripper, with most of the response occurring in the first few mm of length, in accordance with an embodiment of the present invention. In this example case, the entire cladding stripper was about 20 mm in length.

As will be appreciated, the plot of FIG. 9 represents the output of a specific fiber, and other fiber geometries may have, for instance, different looking curves and/or different ranges. In any number of such embodiments, the general principles provided herein may apply and the corresponding plot may exhibit a hill curve shape similar to the one shown in FIG. 9 (or any reasonable variation thereof). As will be further appreciated in light of this disclosure, such a h ii curve like shape can be useful as it may allow, for instance, the amount of power hitting the detector to be tuned by adjusting the location of the detector relative to the peak of the curve. This can be done, for example, to avoid detector saturation when the output is beyond a given threshold or otherwise too high. In accordance with some such embodiments, the amount of power hitting the detector can be adjusted, for example, by varying the distance between the detector and the fiber, and/or the location of the detector along the cladding stripper.

Figure 10:
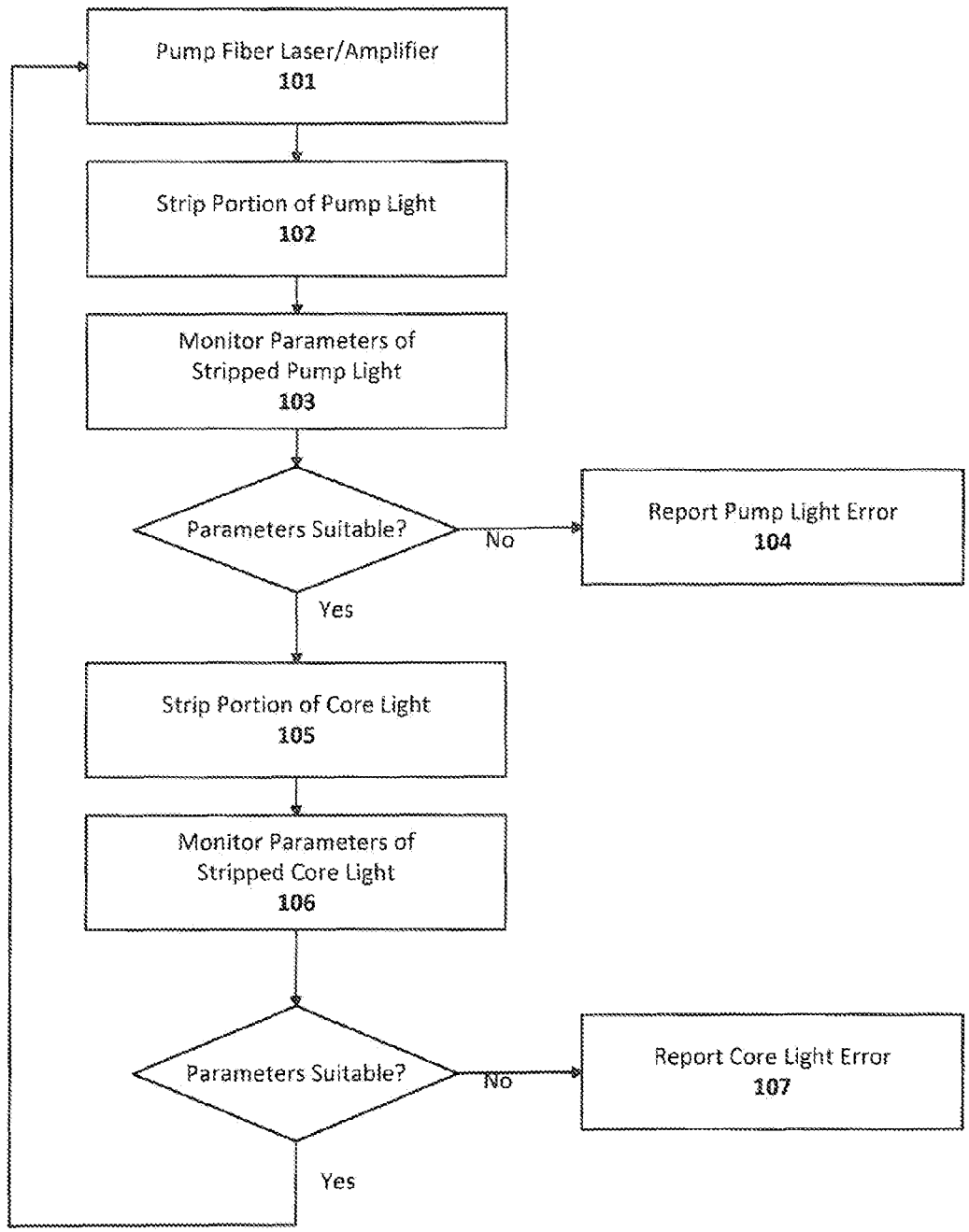
FIG. 10 illustrates a method of monitoring parameters of an optical fiber laser/amplifier system, in accordance with an embodiment of the present invention.

FIG. 10 illustrates a method for monitoring parameters of a fiber laser or fiber amplifier, in accordance with an embodiment of the present invention. Initially, a fiber laser or amplifier is pumped with light, as indicated at 101. The pump light source is often a laser diode, but may be any suitable pump light source. Unabsorbed pump light contacts a cladding stripper and a portion of the pump light may be stripped, as indicated at 102. One or more parameter monitors may then monitor the power, wavelength, phase, or other parameters or events of interest indicated by or otherwise associated with the stripped pump light, as indicated at 103. If one or more of these parameters are not suitable, a pump light error may be reported, as indicated at 104. One such pump light error may be a failure of the laser pump diode that may be detected by reduced pump energy detected by the parameter monitors.

In addition to pump light monitoring, a portion of the leaked core light travelling in the cladding may also be stripped by a cladding stripper, as indicated at 105. Note that this cladding stripper may be the same or distinct from the cladding stripper used to strip pump light at 102. One or more parameter monitors may also monitor the leaked core light, as indicated at 106, to detect errors in the core light power, for example. If the parameters of the stripped core light are not suitable, an error in the core light may be reported, as indicated at 107. The pump light and core light error reports may trigger a control circuit to safeguard the system from potential failures, or otherwise be used to make adjustments to the system to maintain a given specification. If the parameters of the core and pump light are suitable, the system may then continue pumping the laser or amplifier system, as indicated at 101 and the monitoring process may continue as well (e.g., continuous or periodic monitoring). For illustrative purposes, the present method is disclosed in a sequence, however the various elements of this method may he performed in any suitable order, or even simultaneously if desired.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system comprising:
   an optical fiber including:
   a core;
   an inner cladding;
   an outer cladding in direct contact with the inner cladding; and
   a cladding stripper for stripping a light signal propagating in the inner cladding from the inner cladding, wherein the cladding stripper is deposited in direct contact with the inner cladding along at least one complete circumference of the inner cladding and is not in direct contact with the outer cladding; and
   at least one signal parameter monitor embedded in the cladding stripper, for receiving at least a portion of the light signal stripped from the inner cladding.

2. The system of claim 1 wherein the inner cladding contains light propagating in the core, and the outer cladding contains light propagating in the inner cladding.

3. The system of claim 2 wherein the cladding stripper is selectively deposited in direct contact with the inner cladding in one or more locations.

4. The system of claim 1 wherein the at least one signal parameter monitor is associated with at least one filter that passes a light signal of interest to the parameter monitor and excludes light signals of non-interest.

5. The system of claim 1 wherein the system includes multiple signal parameter monitors, each integrated with the cladding stripper and configured to detect a light signal of interest and exclude light signals of non-interest.

6. The system of claim 1 wherein the at least one signal parameter monitor is configured to provide energy information regarding detected light signals to control electronics.

7. The system of claim 6 wherein the control electronics are configured to perform at least one of failure mode detection, failure mode reporting, and failover protection in response to the provided energy information.

8. The system of claim 1 wherein the at least one signal parameter monitor is configured to provide phase information regarding detected light signals to control electronics.

9. The system of claim 8 wherein the control electronics are configured to perform at least one of phase adjustment, failure mode detection, failure mode reporting, and failover protection in response to the provided phase information.

10. The system of claim 1 wherein the at least one signal parameter monitor is configured to provide wavelength information regarding detected light signals to control electronics.

11. The system of claim 1 wherein the at least one signal parameter monitor is configured to receive at least a portion of the light signal from the cladding stripper via at least one waveguide.

12. The system of claim 1 wherein the light signal propagating in the inner cladding includes unabsorbed pump light.

13. The system of claim 1 further comprising a pump source for pumping the inner cladding of the optical fiber, wherein the light signal propagating in the inner cladding includes unabsorbed pump light.

14. The system of claim 1 wherein the cladding stripper is a layer of material surrounding the inner cladding and having a higher refractive index than the inner cladding.

15. A method for monitoring parameters of light within an optical fiber comprising:
    stripping a light signal from an inner cladding along an entire circumference of the inner cladding with a cladding stripper that is not in contact with an outer cladding; and
    receiving at least a portion of the light signal stripped from the inner cladding with at least one signal parameter monitor embedded in the cladding stripper.

16. The method of claim 15 further comprising directing at least a portion of the light stripped from the inner cladding from the cladding stripper to the at least one signal parameter monitor via at least one waveguide.

17. The method of claim 15 wherein receiving at least a portion of the light signal stripped from the inner cladding further comprises detecting a light signal of interest and excluding light signals of non-interest.

18. The method of claim 15 further comprising:
    providing energy information regarding detected light signals from the at least one signal parameter monitor to control electronics; and
    performing at least one of detecting a failure mode, reporting a failure mode, and protecting from failover in response to providing energy information regarding detected light signals.

19. The method of claim 15 further comprising:
    providing phase information regarding detected light signals from the at least one signal parameter monitor to control electronics; and
    performing at least one of adjusting phase, detecting a failure mode, reporting a failure mode, and protecting from failover in response to the provided phase information.

20. The method of claim 15 further comprising providing wavelength information regarding detected light signals to control electronics.

21. The method of claim 15 wherein the cladding stripper is a layer of material deposited along a circumference of the fiber cladding and having a higher refractive index than the fiber cladding.

22. An integrated circuit, comprising:
    an optical fiber configured with a core, an inner cladding for containing light propagating in the core, an outer cladding in direct contact with the inner cladding and for containing light propagating in the inner cladding, and a cladding stripper in place of the outer cladding in at least one location, the cladding stripper in direct contact with the inner cladding and for stripping a light signal propagating in the inner cladding from the inner cladding in all directions, wherein the cladding stripper is not in direct contact with the outer cladding; and
    at least one signal parameter monitor embedded in the cladding stripper, for receiving at least a portion of the light signal stripped from the inner cladding, wherein the at least one signal parameter monitor is associated with at least one filter that passes a light signal of interest to the parameter monitor and excludes light signals of non-interest.

23. The integrated circuit of claim 22 wherein the at least one signal parameter monitor receives at least a portion of the light signal from the cladding stripper via at least one waveguide.

24. The integrated circuit of claim 22 wherein the cladding stripper is a layer of material on the inner cladding and having a higher refractive index than the inner cladding and the outer cladding.

* * * * *